(12) United States Patent
Astapenko

(10) Patent No.: US 10,908,432 B2
(45) Date of Patent: Feb. 2, 2021

(54) READING GLASSES

(71) Applicant: Glens OÜ, Tallinn (EE)

(72) Inventor: Andrei Astapenko, Tallinn (EE)

(73) Assignee: Glens OU, Tallinn (EE)

( * ) Notice: Subject to any disclaimer, the term of this patent is extended or adjusted under 35 U.S.C. 154(b) by 98 days.

(21) Appl. No.: 16/301,165

(22) PCT Filed: Apr. 28, 2017

(86) PCT No.: PCT/EE2017/000004
§ 371 (c)(1),
(2) Date: Nov. 13, 2018

(87) PCT Pub. No.: WO2017/194069
PCT Pub. Date: Nov. 16, 2017

(65) Prior Publication Data
US 2019/0293958 A1    Sep. 26, 2019

(30) Foreign Application Priority Data

May 10, 2016  (EE) ............................... 201600018 U

(51) Int. Cl.
| G02C 5/12 | (2006.01) |
| G02C 5/04 | (2006.01) |
| B64F 1/00 | (2006.01) |
| B64F 1/12 | (2006.01) |
| B64F 1/22 | (2006.01) |

(52) U.S. Cl.
CPC .............. *G02C 5/128* (2013.01); *B64F 1/007* (2013.01); *B64F 1/125* (2013.01); *B64F 1/22* (2013.01); *G02C 5/045* (2013.01); *B64C 2201/18* (2013.01)

(58) Field of Classification Search
CPC .......... G02C 7/086; G02C 7/08; G02C 7/088; G02C 1/06; G02C 5/12; G02C 1/04; G02C 1/02

USPC ...... 351/47, 48, 57, 58, 65, 68, 69, 76, 137, 351/136, 111
See application file for complete search history.

(56) References Cited

U.S. PATENT DOCUMENTS

| 5,907,384 A * | 5/1999 | Kirsch ..................... G02C 9/00 351/47 |
| 9,069,189 B2 | 6/2015 | Shalon |
| 9,684,187 B2 | 6/2017 | Rasier et al. |

FOREIGN PATENT DOCUMENTS

| WO | WO2012069980 A2 | 5/2012 |
| WO | WO2014190166 A1 | 11/2014 |
| WO | WO2015002626 A1 | 1/2015 |

OTHER PUBLICATIONS

International Search Report dated Aug. 22, 2017 in corresponding application PCT/EE2017/000004.

\* cited by examiner

*Primary Examiner* — Hung X Dang
(74) *Attorney, Agent, or Firm* — Muncy, Geissler, Olds & Lowe, P.C.

(57) ABSTRACT

Reading glasses, more specifically pince-nez glasses, for short-term, close viewing and reading. For better placement of the reading glasses on the nose, the bridge of the reading glasses is provided with knobs, of which two are located on the outside, making it comfortable to grasp and place the glasses on the nose with two fingers and third knob is located on the upper centre of the bridge. Bridge of the reading glasses is ergonomic. The measurements of the radius of bridge of the reading glasses have been developed ellipsoidal in shape, where radius $r_1$ is 7.0 mm and $r_2$ is 7.5 mm and the angle α of the bridge is 36°.

13 Claims, 4 Drawing Sheets

READING GLASSES

This nonprovisional application is a National Stage of International Application No. PCT/EE2017/000004, which was filed on Apr. 28, 2017, and which claims priority to Estonian Patent Application No. U201600016, which was filed in Estonia on May 10, 2016, and which are both herein incorporated by reference.

BACKGROUND OF THE INVENTION

Field of the Invention

The present invention relates to reading glasses, in particular nose glasses, that are intended for looking at something that is near, and for reading for short periods of time. They are for use in situations when prescription glasses are not immediately available or when one does not have them yet.

Description of the Background Art

In the state of the art, there are various nose glasses intended for reading, which have been manufactured in one piece or out of silicon material. Reading glasses that are so small that they easily fit into a credit card pocket or watch band or between a book. Making of reading glasses by injection or hot-moulding is also known in the state of the art.

WO2014190166 discloses eyewear which includes lenses, nose pads and a bridge which connects the lenses. The bridge connecting the lenses is bendable and provides a bridge pinch force of 50 g or less via the nose pads when the nose pads are moved 7 mm or less from the bridge rest position.

WO2012069980 discloses eyewear which includes lenses that are interconnected via a lens bridge and a nose clamp connected to it. The nose clamp includes nose pads which rest on the nose of the user. The nose pads are configured to accommodate noses of varying width without substantially affecting the distance between the lenses or their orientation on the face of the user.

WO2015002626 describes silicone eyeglass frames which are flexible enough to take a suitable shape with every nose contour. Thanks to the eyeglass frame material and the designed nose pads, the frames remain on the nose without fail.

One disadvantage of the aforementioned solutions is that the small glasses create a problem of how to place the glasses on the nose correctly and without damaging the glass surface. Another disadvantage is the ergonomic shape of the glasses for convenience of use and for remaining on the nose.

SUMMARY OF THE INVENTION

The purpose of this invention is to provide reading glasses which are very light, with small dimensions, in one piece and which can be placed on the bridge of the nose conveniently. There is a demand for such glasses due to the fact that most of the people use reading glasses which they often forget to take along with them. Reading glasses of the present invention are cheap to manufacture and will be sold in all sales locations, such as, for example, cash desks of stores, restaurants, kiosks, petrol stations, etc.

For better placement of the reading glasses on the nose, the lens bridge of the reading glasses has been equipped with studs, two of which are located on the outer surface of the lens bridge in such a manner that the glasses can be conveniently placed on the nose by holding them with two or three fingers; —the third stud is located in the centre, in the upper part of the lens bridge. These studs help improve the grip when holding the lenses and allow to find the best possible position for the glasses on the nose without the use of a mirror as, the user can feel the midpoint of the product physically with a finger.

The measuring of various noses has been used to develop an ergonomic solution of the lens bridge of the reading glasses. Based on the measuring results, an average cross-section of the nose and an average radius of the nose bridge have been calculated, according to which the glasses of the present invention have been developed.

It is important for the reading glasses to be suitable for users whose radius of nose bridge is bigger or smaller than the average. The cross-section of the upper part of the lens bridge of the reading glasses up to the bottom studs is ellipsoidal and the diameter thereof has been chosen according to the desired elasticity. The wider the nose, the greater the pinch force the nose pads have on the nose. An outcome is achieved where the pinch force is sufficiently great, with regard to narrower noses, to allow the reading glasses to stay on the nose while the pinch force is remains sufficient enough, with regard to wider noses, so that the reading glasses would not push too greatly on the nose or inflict pain on the wearer or leave marks.

Plastic, more particularly copolyester, has been used as the material of the reading glasses. The material of the glasses has to have sufficiently good elasticity and flowability indicators, allowing the manufacturing of a product with a diameter of ca 11 mm, and providing an optically perfect result, i.e. the filling of the mould must be done before the plastic can cool down. Reading glasses made by using the plastic mould method are thin and light.

The nose pad of the reading glasses is unibody, i.e. in one piece, thus the nose pads have been made of the same material as the rest of the glasses. The shape of the nose pad takes ergonomics into account. When placing the glasses on the nose, the nose pad does not abrade the nose, i.e. the nose pad has a smooth edge/connecting part in the lower section of the nose pad. The upper part of the nose pad has a sharp angle to stop the glasses from falling off and to ensure that the glasses stay in place upon wearing. The material used is so elastic that a great/strong pressure is not put onto the nose.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 3:
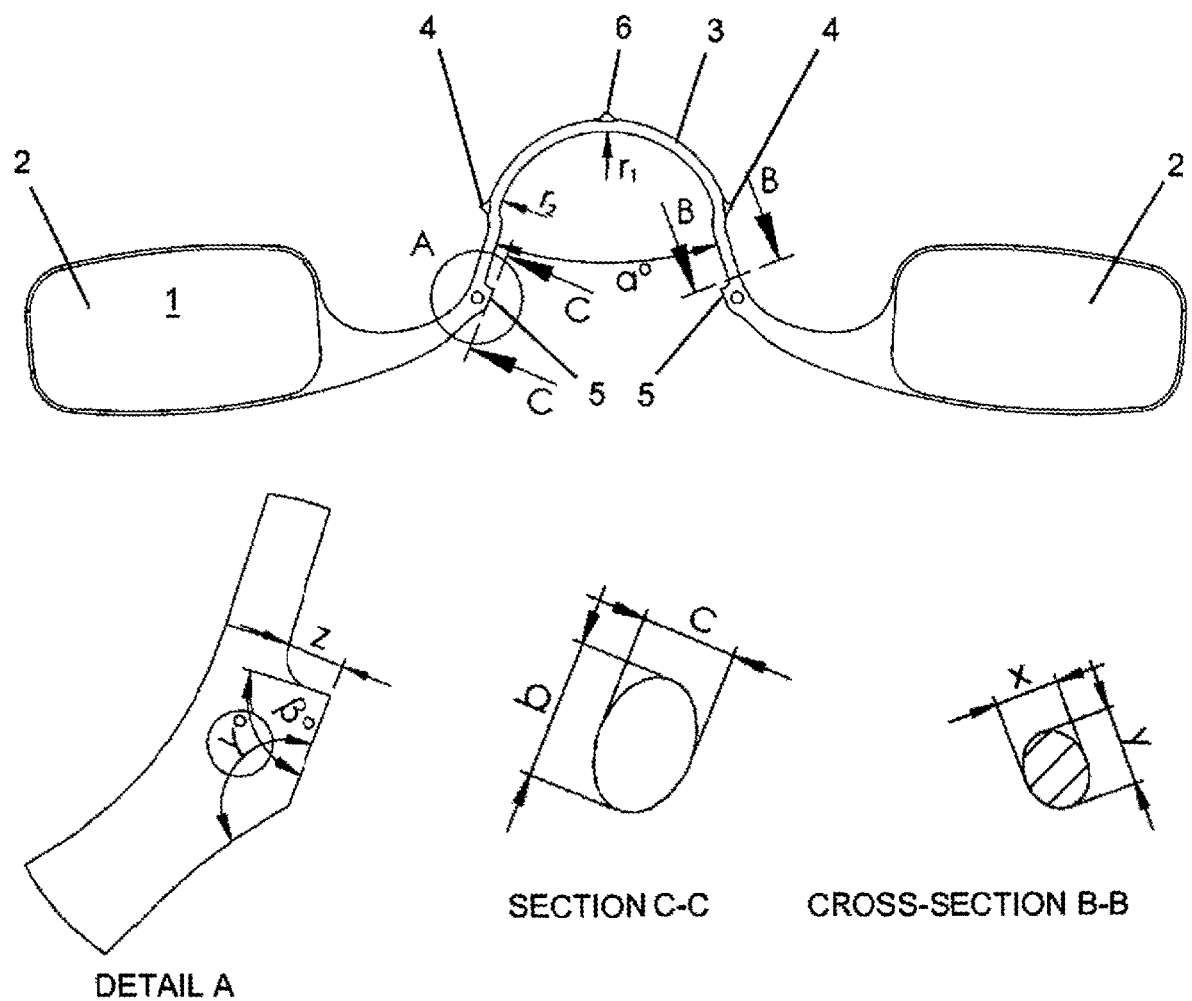
FIG. 3 depicts the reading glasses with a detailed view A of the nose pad of the reading glasses, cross-section B-B of the lens bridge of the reading glasses, and section C-C of the nose pad.

FIG. 3 depicts reading glasses 1, intended for looking at something that is near and for reading for a short period of time; they include industrially-made lenses 2 with the same diopters and which are suitable only for the correction of presbyopia where both eyes need a corrective diopter of the same strength.

The ergonomic solution of reading glasses 1 corresponds to the measuring results that were used to develop the reading glasses. The measures have been taken from the noses of 76 persons. 51% of the persons are male and 49% female.

Figure 1:
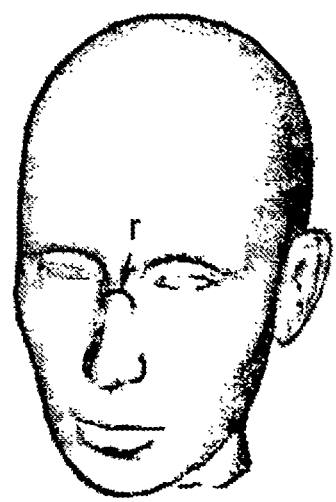
FIG. 1 depicts radius r of the nose bridge.

FIG. 1 depicts radius r of the nose bridge; this is one of the most important measures that ergonomic reading glasses, suitable for a universally large number of users, must comply with. The measuring results, with regard to radius r of the nose bridge, are as follows:

6 mm—15%
7 mm—38%
8 mm—35%
9 mm—12%

The average nose radius r is 7.44 mm.

Figure 2:
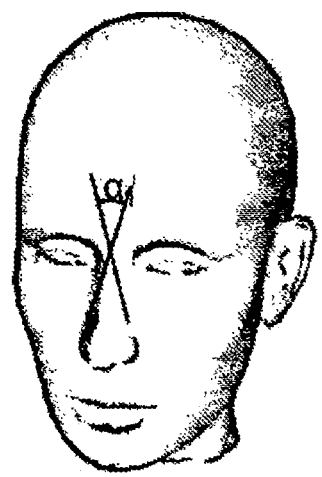
FIG. 2 depicts the inclination angle $\alpha_1$ of the side of the nose.

FIG. 2 depicts another important measure which is inclination $\alpha_1$ of the side of the nose.

The measuring results with regard to inclination $\alpha_1$ of the side of the nose are as follows:

30°-24%
40°-32%
45°-26%
55°-19%

The average inclination $\alpha_1$ of the side of the nose is 42.15°.

Therefore, the developed reading glasses 1 comply with the cross-section of an average nose and this has been depicted in FIG. 3.

Figure 4:
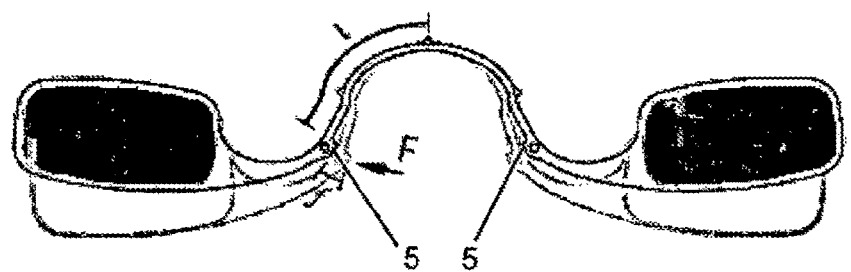
FIG. 4 depicts bending deformation f of the reading glasses.

The developed reading glasses 1 are also suitable for users whose nose bridge radius is bigger or smaller than the average. This is guaranteed by the elastic material used for making reading glasses 1 which allows deformation f per length l, as is shown in FIG. 4.

Copolyester has been chosen as the material of reading glasses 1 of the present invention. Copolyester is a transparent plastic which has good optical characteristics as well as good elasticity. So when moulding the glasses in one piece, the optical portion, as well as the lens bridge portion, have suitable characteristics.

This material is used to make reading glasses 1 having a thickness from 0.5 to 1.25 mm.

Figure 5:
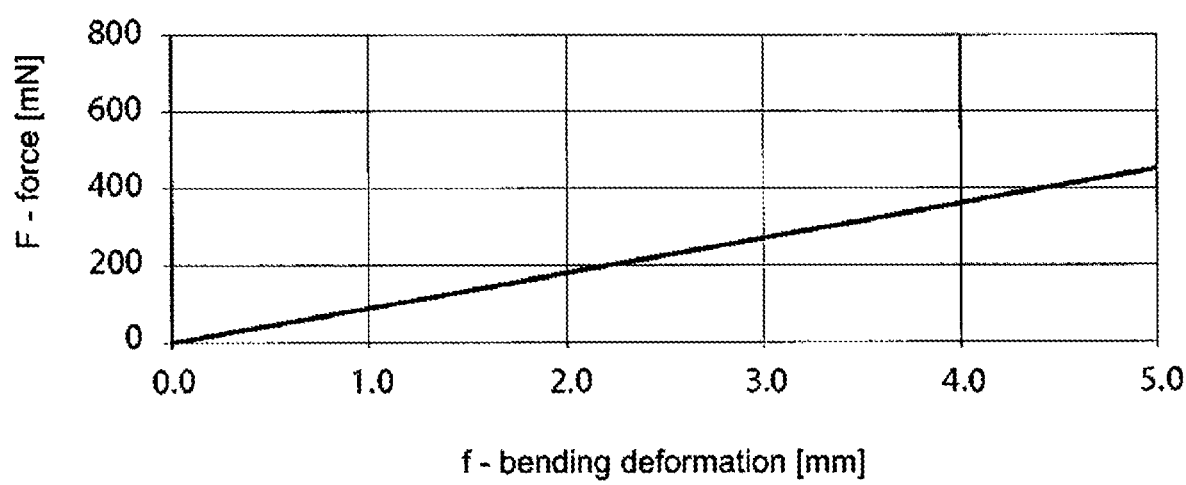
FIG. 5 depicts the ratio of bending deformation f and bending force F in a table.
Figure 6:
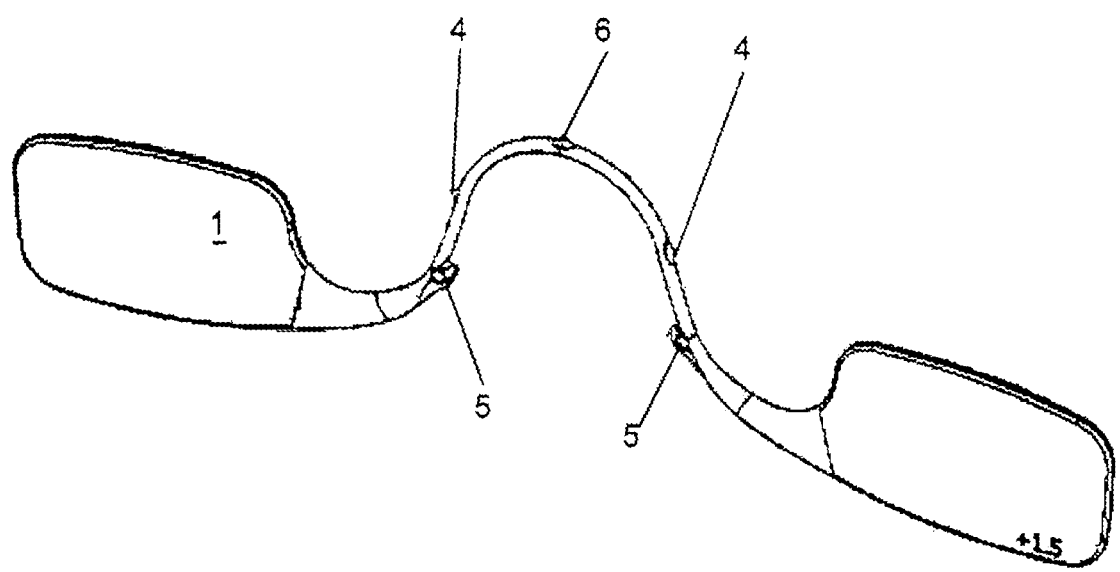
FIG. 6 depicts one possible shape of the reading glasses.

FIG. 3 depicts a cross-section of the upper part of the lens bridge 3 up to the nose pads 5, wherein section A-A is ellipsoidal and the diameter x times y thereof is from 0.6 to 1.0 mm times from 0.7 to 1.33 mm, more particularly 0.8 times 1.0 mm. Such a cross-section of the lens bridge 3 of glasses 1 has been chosen according to a desired elasticity. The wider the nose, the greater the pinch force F the nose pads 5 have on the nose, FIG. 4. An outcome is achieved where the pinch force is sufficiently great, with regard to narrower noses, so that the glasses would stay on the nose and the pinch force is still great enough with regard to wider noses so that the glasses would not push too greatly on the nose or inflict pain on the wearer or leave marks.

$$f = \frac{Fl^3}{8} \div \frac{E}{I}$$

f (bending deformation)
F (force)
l (bar length)—15 mm
E (elasticity module)—1550 MPa
I (moment of inertia)—0.02512 kg m$^2$ As is shown in FIG. 4 and in the table of FIG. 5, reading glasses 1 have been developed, wherein the radius of the lens bridge 3 is ellipsoidal. Radiuses $r_1$ and $r_2$ of the ellipse are from 6.0 mm to 9.0 mm. Radius $r_1$ of the upper tip of the lens bridge is 7.00 mm and the radius $r_2$ near the lateral studs 4 is 7.5 mm.

The inclination $\alpha$ of the sides of the lens bridge 3 of the reading glasses 1 is from 32 to 40°, more particularly 36°. The inclination $\alpha$ of the sides of the lens bridge 3 of the reading glasses 1 differs from the average inclination $\alpha_1$ obtained from measuring such that the reading glasses 1 would put pressure on the nose. The inclination of 36° of the lens bridge 3 of the reading glasses 1 has been obtained based by the testing of various lens bridge prototypes. For better placement of reading glasses 1 on the nose, the lens bridge 3 of the reading glasses 1 has been equipped with studs 4 and 6, two studs 4 of which are located on the outer surface of the lens bridge 3 such that glasses can be conveniently placed on or taken off the nose by holding them with two fingers. The third stud 6 is located in the centre in the upper part of the lens bridge and is intended for final placement/centring of the glasses 1 with one finger.

FIG. 5 depicts detail A and section C-C of the nose pad 5 of the reading glasses 1. The nose pad 5 of the reading glasses 1 is unibody, i.e. in one piece, thus the material of the nose pad 5 is exactly the same as the material of the rest of the glasses 1. The shape of the nose pad 5 takes ergonomics into account. The cross-section of the nose pad 5 is ellipsoidal. The height b of the ellipse is from 1.0 to 1.0 mm, more particularly 1.45 mm, and the width c is from 0.7 mm to 1.3 mm, more particularly 1.0 mm. The height z of the nose pad is from 0.5 mm to 0.9 mm, more particularly 0.7 mm.

The angle β of the upper edge of the nose pad 5 is acute from 80 to 90°, more particularly 85°, to provide a better hold. The bottom angle Y of the nose pad 5 is obtuse from 135 to 152°, more particularly 143°, to make the placement of the reading glasses on the nose more convenient.

When placing the reading glasses 1 on the nose, the nose pad 5 does not abrade the nose, i.e. the nose pad 5 has a smooth edge/connecting part in the lower part of the nose pad 5. The material used is so elastic that a great/strong pressure is not put on the nose.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Nose glasses comprising:
   two lenses, and
   a lens bridge connecting the two lenses, an inner surface of a lower part of the lens bridge having two nose pads,
   wherein the radius of the lens bridge is ellipsoidal, with radiuses $r_1$ and $r_2$ of the ellipse each being from 6.00 to 9.00 mm;
   wherein an inclination α of sides of the lens bridge is between 32-40°;
   wherein a first stud, a second stud and a third stud are located on an outer surface of an upper part of the lens bridge for placing the reading glasses on or taking the reading glasses off with two or three fingers;
   wherein the third stud is located between the first stud and the second stud, the third stud being located at the center of the upper part of the lens bridge for final placement and centering of the reading glasses with one finger; and
   wherein the two lenses, the lens bridge and the two nose pads are made of a plastic material.

2. The nose glasses according to claim 1, wherein each of the two nose pads protrude from the inner surface of the lens bridge and wherein a height z of each of the two nose pads is between 0.5-0.9 mm.

3. The nose glasses according to claim 2, wherein the height z of each of the two nose pads is 0.7 mm.

4. Reading glasses according to claim 1, wherein each of the two nose pads protrude from the inner surface of the lens bridge and wherein each of the two nose pads is ellipsoidal, wherein a height b of the ellipse is from 1.0 mm to 1.9 mm, and a width c of the ellipse is from 0.7 mm to 1.3 mm.

5. The nose glasses according to claim 4, wherein the height b of the ellipse is 1.45, and the width c of the ellipse is 1.0 mm.

6. The nose glasses according to claim 1, wherein each of the two nose pads protrude from the inner surface of the lens bridge and wherein an angle β of an upper edge of each of the two nose pads is acute between 80-90°.

7. The nose glasses according to claim 6, wherein an angle Y of a lower edge of each of the two nose pads is obtuse between 135-152°.

8. The nose glasses according to claim 7, wherein the angle β of the upper edge of each of the two nose pads is 85° and wherein the angle Y of the lower edge of each of the two nose pads is 143.5°.

9. The nose glasses according to claim 1, wherein the reading glasses are made in one piece via casting.

10. The nose glasses according to claim 1, wherein the plastic material is copolyester.

11. The nose glasses according to claim 1, wherein a thickness of the reading glasses is from 0.5 to 1.25 mm.

12. The nose glasses according to claim 1, wherein radius $r_1$ is 7.00 mm and radium $r_2$ is 7.50 mm.

13. The nose glasses according to claim 1, wherein the inclination of the sides of the lens bridge of the reading glasses is 36°.

* * * * *